(12) United States Patent
Jung et al.

(10) Patent No.: US 11,667,539 B2
(45) Date of Patent: Jun. 6, 2023

(54) METHOD FOR PREPARATION OF OXIDE SUPPORT-NANOPARTICLE COMPOSITES

(71) Applicant: KOREA ADVANCED INSTITUTE OF SCIENCE AND TECHNOLOGY, Daejeon (KR)

(72) Inventors: WooChul Jung, Daejeon (KR); Jun Kyu Kim, Daejeon (KR); Bonjae Koo, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 215 days.

(21) Appl. No.: 17/097,084

(22) Filed: Nov. 13, 2020

(65) Prior Publication Data
US 2021/0188656 A1 Jun. 24, 2021

(30) Foreign Application Priority Data
Dec. 18, 2019 (KR) .................. 10-2019-0169815

(51) Int. Cl.
*C01G 23/00* (2006.01)
*B82B 3/00* (2006.01)
*B82Y 40/00* (2011.01)

(52) U.S. Cl.
CPC .......... *C01G 23/003* (2013.01); *B82B 3/0038* (2013.01); *B82Y 40/00* (2013.01); *C01P 2002/34* (2013.01); *C01P 2004/64* (2013.01); *C01P 2006/10* (2013.01)

(58) Field of Classification Search
CPC .......................... C01G 23/003; B82B 3/0038
See application file for complete search history.

(56) References Cited

U.S. PATENT DOCUMENTS

| | | | |
|---|---|---|---|
| 2004/0206296 A1 | 10/2004 | Lee et al. | |
| 2006/0145126 A1* | 7/2006 | Chartier | C04B 35/2641 252/500 |
| 2012/0046163 A1* | 2/2012 | Ifrah | C01G 45/1264 502/263 |
| 2017/0100697 A1 | 4/2017 | Serra Alfaro et al. | |

FOREIGN PATENT DOCUMENTS

| | | |
|---|---|---|
| EP | 03168877 | 5/2017 |
| KR | 10-2015-0098453 | 8/2015 |
| KR | 10-2015-0145425 | 12/2015 |
| KR | 10-2017-0130216 | 11/2017 |

(Continued)

OTHER PUBLICATIONS

Hyeon Han et al., "Lattice strain-enhanced exsolution of nanoparticles in thin films", Nature Communications vol. 10, Article number 1471 (2019).

(Continued)

*Primary Examiner* — James A Fiorito
(74) *Attorney, Agent, or Firm* — Lex IP Meister, PLLC

(57) ABSTRACT

There is provided a method for preparation of oxide support-nanoparticle composites, in which metal nanoparticles decorate with uniform size and distribution on the surface of an oxide support, and thus, high performance oxide support-nanoparticle composites that can be applied in the fields of heterogeneous catalysis can be provided.

9 Claims, 3 Drawing Sheets

(56) References Cited

FOREIGN PATENT DOCUMENTS

KR    10-2018-0088102    8/2018

OTHER PUBLICATIONS

Jun Kyu Kim et al., "Control of Size and Distribution of Exsolved Nanoparticles Achieved through Nucleation Engineering", 2019 Fall Meeting of The Korean Ceramic Society, Nov. 14, 2019.
Yang Gao et al., "Energetics of Nanoparticle Exsolution from Perovskite Oxides", The Journal of Physical Chemistry Letters, Jun. 18, 2018. DOI: 10.1021/acs.jpclett.8b01380.
Jun Kyu Kim et al., "Exceptional Tunability over Size and Density of Spontaneously Formed Nanoparticles via Nucleation Dynamics", ACS Appl. Mater. Interfaces 2020, 12, 24039-24047. https://dx.doi.org/10.1021/acsami.0c05215.
Kyeounghak Kim et al., "Control of transition metal—oxygen bond strength boosts the redox ex-solution in perovskite oxide surface", Energy & Environmental Science, 2020, DOI: 10.1039/D0EE01308K.

\* cited by examiner

[Fig. 1]
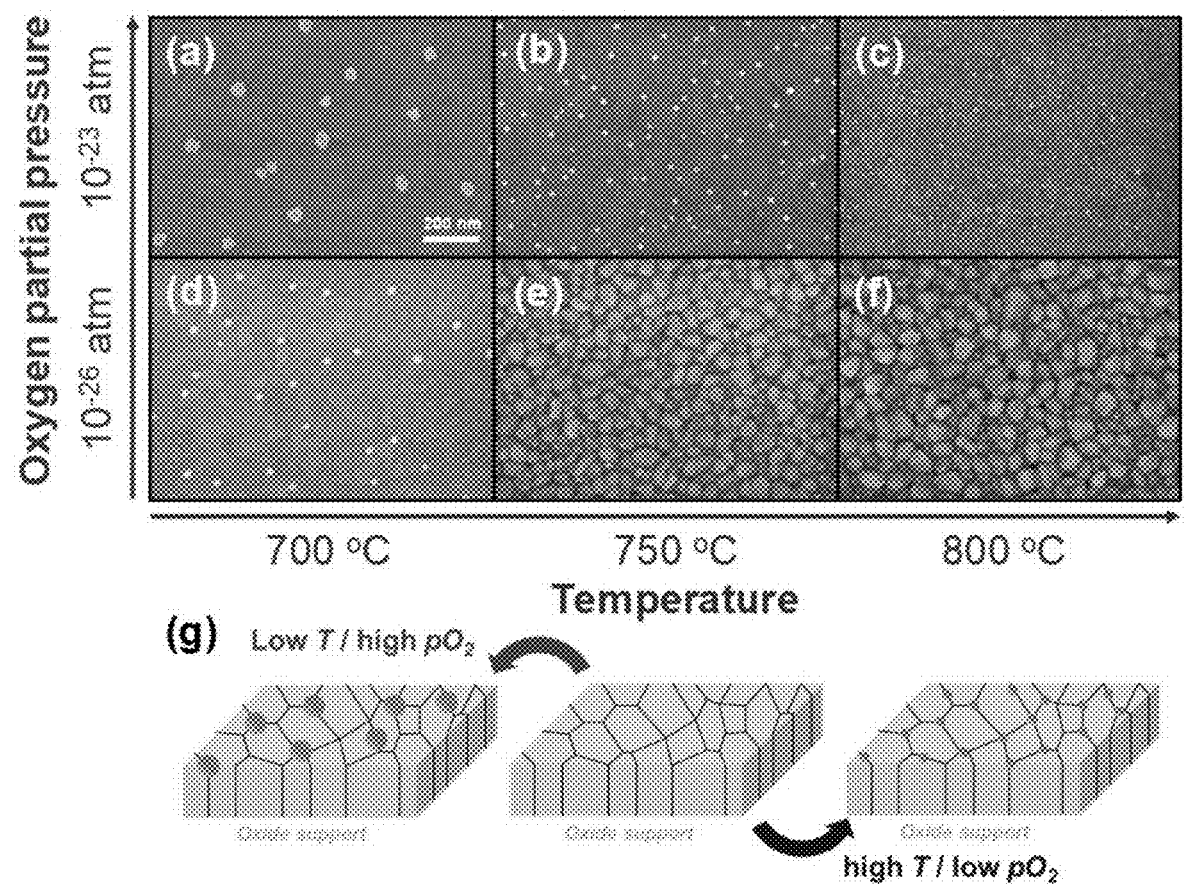

[Fig. 2]
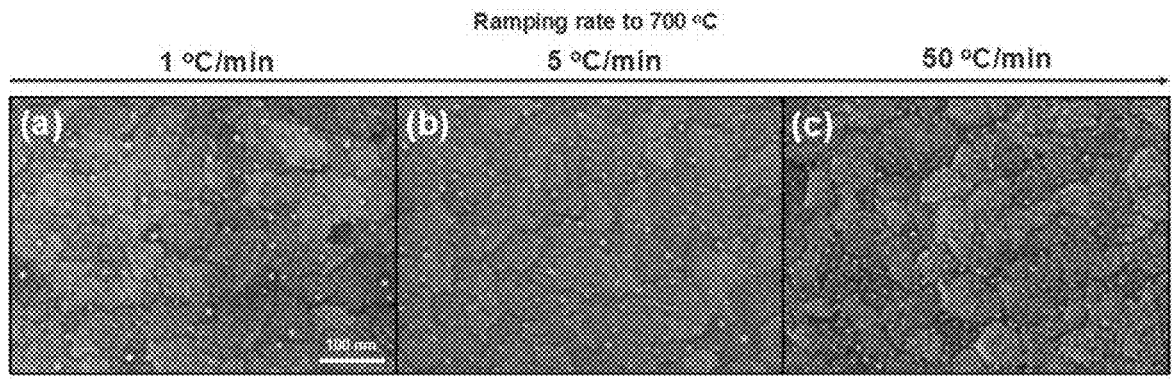
[Fig.3]
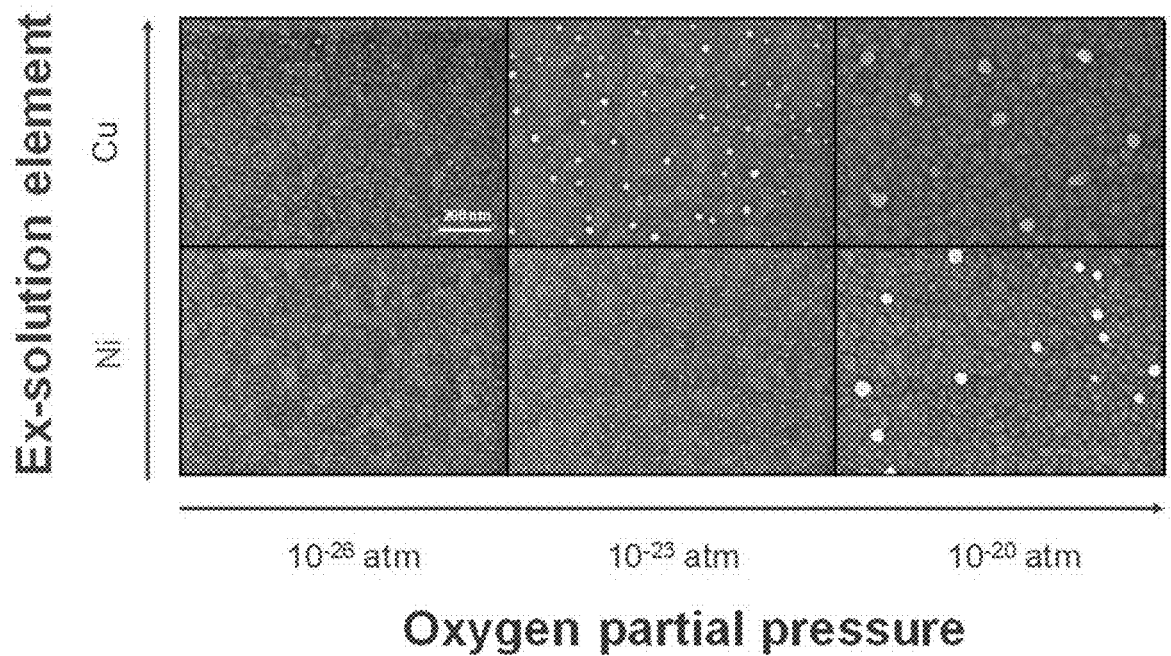

[Fig. 4]
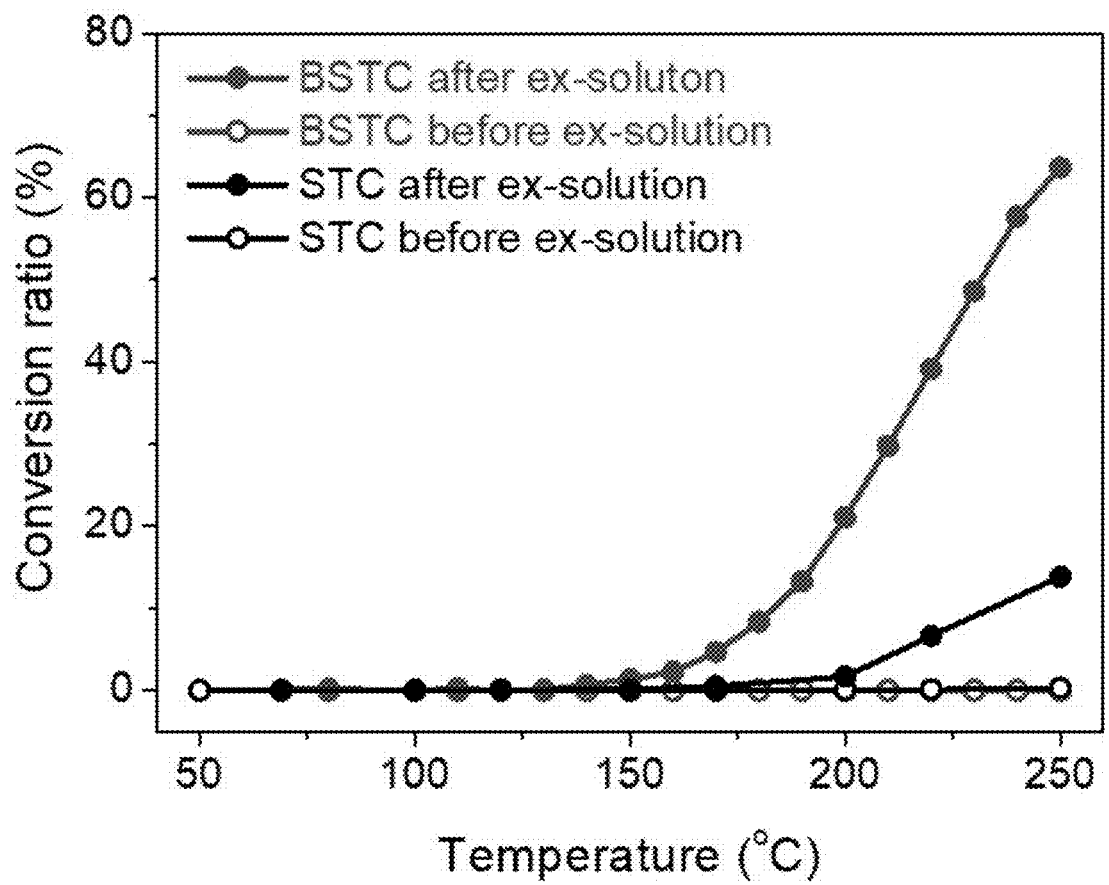

METHOD FOR PREPARATION OF OXIDE SUPPORT-NANOPARTICLE COMPOSITES

BACKGROUND OF THE INVENTION (a) Field of the Invention

The invention relates to a method for preparation of oxide support-nanoparticle composites, in which metal nanoparticles decorated with uniform size and distribution on the surface of an oxide support.

(b) Description of the Related Art

Metal/oxide composites (supported catalysts) in which metal nanoparticles are uniformly dispersed on an oxide support are receiving much attention in the field of heterogeneous catalysis due to high surface dispersibility, reactivity and cost efficiency. Industrially, such a supported catalyst is widely used in fields of various catalyst systems such as petroleum refining, automobile exhaust gas treatment, catalytic combustion, and electrochemical catalytic reactions.

Until now, in order to obtain uniform metal nanoparticles possessing excellent reactivity and selectivity compared to homogeneous catalysts, many efforts have been made to effectively control the size and distribution of metal nanoparticles. In addition, particularly in high temperature reactions, improvement in high temperature stability against to the sintering of metal nanoparticles (deterioration of catalytic reactivity) has attracted worldwide attention. Thus, the developments of technology that can not only maintain high temperature durability of metal nanoparticles, but also effectively control the size and distribution thereof, remains a future task.

Recently, an "ex-solution" phenomenon for real time growing of metal nanoparticles from an oxide support directly has been reported as a new method to obtain supported catalysts in which metal nanoparticles are uniformly dispersed on the surface of an oxide. "Ex-solution" is a phenomenon wherein a metal having catalytic activity is dissolved inside of lattice crystals in form of solid solution under an oxidizing atmosphere, but when the oxide solid solution exposed to a reducing atmosphere, is ex-solved in the form of metal nanoparticles on the surface of an oxide support. Since "ex-solution" is spontaneous phase separation, it has an advantage in that only if exposed to a reducing atmosphere, the synthesis and dispersion of nanoparticles are simultaneously achieved without additional processes. Moreover, unlike nanoparticles randomly dispersed on an oxide support prepared by the conventional deposition technology (e.g., physical and chemical vapor deposition, impregnation and so on), ex-solved nanoparticles have high thermal and chemical stability because they are partially pinned to the oxide surface. Thus, such ex-solution is very suitable for an operating environment in the field of high temperature catalysts or in the field of energy.

In principle, an ex-solution phenomenon is a result of phase transition of a surface of oxide solid solution according to redox reactions due to a thermodynamic phase stability difference according to temperature and gas conditions in the operating environment. Thus, many studies are progressed to tune the energy state of oxide solid solution (e.g., "intrinsic properties" such as composition or stoichiometry of the oxide), so as to considerably dynamically lead the ex-solution phenomenon. However, in contrast, there have been insufficient studies on the influence of "extrinsic properties" such as a heat treatment environment. Particularly, though numerous gases (wet/dry $H_2$, CO, Ar, $N_2$, syngas, etc.) are used as reducing gases, no studies have been reported on the control of the size and distribution of ex-solved particles by precise control of oxygen chemical potential.

According to many documents, ex-solved nanoparticles have high resistibility to sintering (or coarsening) at a high temperature. Thus, it can be expected that the size or number density of ex-solved nanoparticles is preferentially determined by the nucleation and growth of particles. However, there is insufficient research on nucleation and growth relating to ex-solved nanoparticles.

Thus, the inventors intensively investigated a change in ex-solution dynamics according to heat treatment conditions, and particularly, as a result of intensive studies on the influence of oxygen chemical potential on the nucleation of an ex-solution, it was confirmed that smaller and more nanoparticles are formed at a higher heat treatment temperature and under a lower oxygen partial pressure, as described below, and the invention was completed.

SUMMARY OF THE INVENTION

It is an object of the invention to provide a method for preparation of oxide support-nanoparticle composites, in which metal nanoparticles exist with uniform size and distribution on the surface of an oxide support.

There is provided a method for preparation of oxide support-nanoparticle composites, including the steps of:

preparing a support consisting of perovskite oxide represented by the following Chemical Formula 1 (step 1); and heat treating the support at 350 to 900° C. under an oxygen partial pressure of $10^{-35}$ to $10^{-12}$ atm to form nanoparticles on the support (step 2):

$$A_xB_{1-y}B'_yO_3 \qquad \text{[Chemical Formula 1]}$$

in Chemical Formula 1, x is 0.9 to 1, y is 0.05 to 0.25,

A is one or more selected from the group consisting of Pr, Nd, Ca, Sr, Ba, and La, B is Zr, Cr, Al, Ti, Mn, Fe, or Co, and B' is Mn, Fe, Co, Ni, Cu, Pd, Ir, Ru, or Pt, with the proviso that B and B' are not the same.

As used herein, the term "oxide support nanoparticle composite" means a structure in which nanoparticles are formed on the surface of a support consisting of oxide. Herein, the shape of the oxide support is not specifically limited, but preferably, it has a flat shape such as a layer. Further, the nanoparticles exist with uniform size and distribution on the surface of the oxide support.

Hereinafter, the invention will be explained in detail according to each step.

(Step 1)

Step 1 is a step of preparing a support consisting of a perovskite oxide represented by the following Chemical Formula 1. In Chemical Formula 1, B' becomes the constructional element of metal nanoparticles according to step 2 as described below.

In Chemical Formula 1, A is one or more selected from the group consisting of Pr, Nd, Ca, Sr, Ba, and La, wherein "one or more" means that for example, both Sr and Ba exist in A.

Further, in Chemical Formula 1, B is Zr, Cr, Al, Ti, Mn, Fe, or Co, and preferably Ti.

Further, in Chemical Formula 1, B' is Mn, Fe, Co, Ni, Cu, Pd, Ir, Ru, or Pt, and it becomes the constructional element of metal nanoparticles according to step 2 as described below.

Meanwhile, although a method for preparing a support consisting of a perovskite oxide represented by the following Chemical Formula 1 is not specifically limited, for example, it may be prepared by PLD (Pulsed Laser Deposition), sputtering, evaporation, solid state reaction, a sol-gel method, and the like. Further, in order to prepare a flat support such as a layer, it is preferable that a support is formed on a flat substrate.

(Step 2)

Step 2 is a step of heat treating the support prepared in step 1 to form nanoparticles on the surface of the support.

As explained above, B' existing in Chemical Formula 1 is dissolved inside of the crystal lattice of the perovskite compound to form a solid solution, but if exposed to a reducing atmosphere, it is ex-solved to form metal nanoparticles, which is referred to as an "ex-solution" phenomenon. That is, an oxide support including B' elements is formed first, then metal nanoparticles are formed on the oxide support using the ex-solution phenomenon, and thus, metal nanoparticles exist with uniform size and distribution on the surface of the oxide support.

Herein, since heat treatment conditions have an influence on the formation of metal nanoparticles, in order to form metal nanoparticles with uniform size and distribution on the surface of the oxide support, heat treatment conditions should be controlled, and the support is heat treated under an oxygen partial pressure of $10^{-35}$ to $10^{-12}$ atm, preferably under an oxygen partial pressure of $10^{-26}$ to $10^{-17}$ atm. In addition, the heat treatment temperature is 350 to 900° C., preferably 650 to 800° C. Within the above ranges of oxygen partial pressure and heat treatment temperature, metal nanoparticles may be formed with uniform size and distribution on the surface of an oxide support.

Specifically, in the oxide support-nanoparticle composite formed according to step 2, the average diameter of the nanoparticles is 5 nm to 100 nm, preferably 7 nm to 60 nm. Further, the nanoparticles exist at a density of 0.1/um$^2$ to 600/um$^2$, preferably 10 to 600/um$^2$, on the oxide support-nanoparticle composite.

Further, preferably, the heat treatment time of step 2 is 2 hours to 10 hours. If the heat treatment time is less than 2 hours, due to a short heat treatment time, the formation of metal nanoparticles may be insufficient, and if the heat treatment time is greater than 10 hours, the formation of metal nanoparticles may not substantially increase.

Further, preferably, the heat treatment of step 2 includes raising a temperature from room temperature (25° C.) to a temperature of 350 to 900° C. (preferably 650 to 800° C.) at temperature rise speed of 1 to 50° C./min. The temperature rise speed may also have an influence on the formation of metal nanoparticles, and as the temperature rise speed is faster, the diameter of metal nanoparticles becomes smaller and the density increases.

(Oxide Support-Nanoparticle Composite)

In the oxide support-nanoparticle composite prepared as explained above, metal nanoparticles exist with uniform size and distribution on the surface of an oxide support.

Thus, the oxide support-nanoparticle composite may be used as a heterogeneous catalyst, and may be widely used in the fields where heterogeneous catalysts are used, for example, in the fields of various catalyst system such as petroleum refining, automobile exhaust gas treatment, catalytic combustion, and electrochemical catalytic reactions.

Particularly, since metal nanoparticles are formed on the oxide support by an "ex-solution" phenomenon, high temperature durability is excellent, and metal nanoparticles exist with uniform size and distribution on the surface of the oxide support, thereby exhibiting remarkably excellent effects compared to the conventional supported catalysts.

As explained above, there is provided a method for preparation of oxide support-nanoparticle composites, in which metal nanoparticles decorate with uniform size and distribution on the surface of an oxide support, and thus, high performance oxide support-nanoparticle composites that can be applied in the fields of heterogeneous catalysis can be provided.

BRIEF DESCRIPTION OF THE DRAWINGS

FIG. 1 shows the results of observation according to Experimental Example 1 of the invention. Further, (g) of FIG. 1 graphically shows the results of Experimental Example 1.

FIG. 2 shows the results of observation according to Experimental Example 2.

FIG. 3 shows the results of observation according to Experimental Example 3.

FIG. 4 shows the results of observation according to Experimental Example 4.

DETAILED DESCRIPTION OF THE EMBODIMENTS

Hereinafter, preferable examples are presented for better understanding of the invention. However, these examples are presented only as illustrations of the invention, and the invention is not limited thereby.

Experimental Example 1

After loading a single phase $Sr_{0.98}Ti_{0.95}Co_{0.05}O_3$ thin film in a tube furnace, a gas with an appropriate $H_2/H_2O$ ratio was flowed so as to set up each oxygen partial pressure ($10^{-26}$ atm and $10^{-23}$ atm) at each set up temperature (700° C., 750° C., and 800° C.). While confirming oxygen partial pressure with an oxygen partial pressure sensor in real time, after the gas reached a steady-state, the temperature was raised from room temperature (25° C.) to the set up temperature at 5° C./min. Subsequently, the surface of each thin film was observed with a SEM, and the results are shown in FIG. 1.

Experimental Example 2

After loading a single phase $Sr_{0.98}Ti_{0.95}Co_{0.05}O_3$ thin film in a tube furnace, 100% $H_2$ gas was flowed so as to give sufficient driving force with gas. Herein, an oxygen partial pressure was confirmed to be about $10^{-29}$ atm. Subsequently, the temperature was raised from room temperature (25° C.) to 700° C. at each set up temperature rise speed (1° C./min, 5° C./min, and 50° C./min). Subsequently, the surface of each thin film was observed with a SEM, and the results are shown in FIG. 2.

Experimental Example 3

After loading each perovskite thin film doped with Mn, Fe, Ni, or Cu ($Sr_{0.98}Ti_{0.95}Mn_{0.05}O_3$, $Sr_{0.98}Ti_{0.95}Fe_{0.05}O_3$, $Sr_{0.98}Ti_{0.95}Ni_{0.05}O_3$, $Sr_{0.98}Ti_{0.95}Cu_{0.05}O_3$) in a tube furnace, gas with an appropriate $H_2/H_2O$ ratio was flowed so as to set up each oxygen partial pressure ($10^{-26}$ atm, $10^{-23}$ atm, and $10^{-20}$ atm) at 700° C. While confirming oxygen partial pressure with an oxygen partial pressure sensor in real time, after gas reached a steady-state, the temperature was raised from room temperature (25° C.) to 700° C. at 5° C./min. Subsequently, the surface of each thin film was observed with a SEM, and the results are shown in FIG. 3.

Experimental Example 4

After loading each perovskite thin film to which Ba and Co were added (STC: $SrTi_{0.75}Co_{0.25}O_3$, and BSTC: $Ba_{0.05}Sr_{0.95}Ti_{0.75}Co_{0.25}O_3$) in a tube furnace, gas consisting of 5 vol % $H_2$+95 vol % Ar was flowed to make a steady-state. Herein, the oxygen partial pressure was confirmed to be ~$10^{-30}$ atm. Subsequently, heat treatment was conducted by raising the temperature from room temperature (25° C.) to 500° C. at 5° C./min.

The above-prepared samples were loaded in a tube furnace connected with a mass spectroscope, and while flowing gas consisting of 1 vol % CO, 4 vol % $O_2$, and 95 vol % Ar, the degree of $CO_2$ formation was measured by mass spectroscopy according to temperature, and the results are shown in FIG. 4.

What is claimed is:

1. A method for preparation of oxide support-nanoparticle composites, comprising the steps of:
    preparing a support consisting of perovskite oxide represented by the following Chemical Formula 1 (step 1); and
    heat treating the support at 350 to 900° C. under an oxygen partial pressure of $10^{-26}$ to $10^{-17}$ atm to form nanoparticles on the support (step 2):

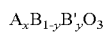  [Chemical Formula 1]

in Chemical Formula 1,
    x is 0.9 to 1,
    y is 0.05 to 0.25,
    A is one or more selected from the group consisting of Pr, Nd, Ca, Sr, Ba, and La,
    B is Zr, Cr, Al, Ti, Mn, Fe, or Co, and
    B' is Mn, Fe, Co, Ni, Cu, Pd, Ir, Ru, or Pt,
    with the proviso that B and B' are not the same.

2. The method for preparation of oxide support-nanoparticle composites according to claim 1, wherein B is Ti.

3. The method for preparation of oxide support-nanoparticle composites according to claim 1, wherein the heat treatment time of step 2 is 2 hours to 10 hours.

4. The method for preparation of oxide support-nanoparticle composites according to claim 1, wherein the heat treatment of step 2 comprises raising a temperature from room temperature to a temperature of 350 to 900° C. at a temperature rise speed of 1 to 50° C./min.

5. The method for preparation of oxide support-nanoparticle composites according to claim 1, wherein the heat treatment of step 2 comprises raising a temperature from room temperature to a temperature of 650 to 800° C. at a temperature rise speed of 1 to 50° C./min.

6. The method for preparation of oxide support-nanoparticle composites according to claim 1, wherein the average diameter of the nanoparticles is 5 nm to 100 nm.

7. The method for preparation of oxide support-nanoparticle composites according to claim 1, wherein the average diameter of the nanoparticles is 7 nm to 60 nm.

8. The method for preparation of oxide support-nanoparticle composites according to claim 1, wherein the nanoparticles exist at a density of $0.1/um^2$ to $600/um^2$ on the oxide support-nanoparticle composite.

9. The method for preparation of oxide support-nanoparticle composites according to claim 1, wherein the metal nanoparticles consist of the B' element of Chemical Formula 1.

* * * * *